(12) United States Patent
Kubota et al.

(10) Patent No.: US 9,864,564 B2
(45) Date of Patent: *Jan. 9, 2018

(54) INFORMATION PROCESSING DEVICE, INFORMATION PROCESSING METHOD, AND RECORDING MEDIUM

(71) Applicant: Seiko Epson Corporation, Tokyo (JP)

(72) Inventors: Mitsuru Kubota, Matsumoto (JP); Koichiro Ota, Omachi (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/475,667

(22) Filed: Mar. 31, 2017

(65) Prior Publication Data

US 2017/0206053 A1 Jul. 20, 2017

Related U.S. Application Data

(63) Continuation of application No. 14/453,825, filed on Aug. 7, 2014, now Pat. No. 9,645,781.

(30) Foreign Application Priority Data

Aug. 12, 2013 (JP) .................................. 2013-167633
May 21, 2014 (JP) .................................. 2014-104998

(51) Int. Cl.
*G06F 3/14* (2006.01)
*G09G 3/00* (2006.01)
*G09G 5/14* (2006.01)

(52) U.S. Cl.
CPC .......... *G06F 3/1454* (2013.01); *G06F 3/1423* (2013.01); *G09G 3/002* (2013.01); *G09G 5/14* (2013.01); *G09G 2354/00* (2013.01)

(58) Field of Classification Search
CPC ....... G06F 3/1454; G06F 3/1423; G09G 5/14; G09G 3/002; G09G 2354/00
See application file for complete search history.

(56) References Cited

U.S. PATENT DOCUMENTS

| 8,462,273 B2 | 6/2013 | Kumamoto |
| 2004/0130502 A1 | 7/2004 | Sato et al. |

(Continued)

FOREIGN PATENT DOCUMENTS

| JP | 2009-251306 A | 10/2009 |
| JP | 2010-54550 A | 3/2010 |

(Continued)

OTHER PUBLICATIONS

Non-Final Office Action received in U.S. Appl. No. 14/453,825; dated Oct. 22, 2015.

(Continued)

*Primary Examiner* — Premal Patel
(74) *Attorney, Agent, or Firm* — ALG Intellectual Property, LLC

(57) ABSTRACT

An information processing device includes: an image output unit which outputs a screen displayed on a display unit to an image display device; a display control unit which displays a first screen including a user interface screen at least in a part of the screen; a detection unit which detects that the user interface screen is switched from a first state that does not include predetermined information to a second state that includes the information; and an output control unit which outputs a second screen that does not include the user interface screen, instead of the first screen displayed by the display control unit, to the image output unit, if it is detected that the user interface screen is switched from the first state to the second state.

10 Claims, 8 Drawing Sheets

(56) References Cited

U.S. PATENT DOCUMENTS

| | | |
|---|---|---|
| 2004/0130568 A1 | 7/2004 | Nagano et al. |
| 2006/0031779 A1 | 2/2006 | Theurer et al. |
| 2008/0074560 A1 | 3/2008 | Ichieda |
| 2010/0214540 A1 | 8/2010 | Sajadi et al. |
| 2012/0030594 A1* | 2/2012 | Yokoyama ............ G06F 3/1454 715/765 |
| 2012/0030595 A1 | 2/2012 | Itahana et al. |

FOREIGN PATENT DOCUMENTS

| | | |
|---|---|---|
| JP | 2011-215530 A | 10/2011 |
| JP | 2012-32934 A | 2/2012 |

OTHER PUBLICATIONS

Final Office Action received in U.S. Appl. No. 14/453,825; dated May 13, 2016.
Advisory Action received in U.S. Appl. No. 14/453,825; dated Jul. 27, 2016.
Notice of Allowance received in U.S. Appl. No. 14/453,825; dated Jan. 5, 2017.

\* cited by examiner

INFORMATION PROCESSING DEVICE, INFORMATION PROCESSING METHOD, AND RECORDING MEDIUM

CROSS-REFERENCE TO RELATED APPLICATION

The present application is a continuation application of U.S. patent application Ser. No. 14/453,825 filed on Aug. 7, 2014, which claims priority from Japanese Patent Application No. 2013-167633 filed Aug. 12, 2013 and Japanese Patent Application No. 2014-104998 filed May 21, 2014, all of which are expressly incorporated by reference herein.

BACKGROUND

1. Technical Field

The present invention relates to an information processing device, an information processing method, and a recording medium.

2. Related Art

A system in which a single image display device is shared by plural users, that is, a system in which video signals outputted from plural computers are projected simultaneously on a single image display device, for example, a projector, is known. With respect to this system, JP-A-2011-215530 describes a technique for displaying, on the computer screens, an operation screen to change the projection screen. Meanwhile, though not related to the system in which a single image display device is shared by plural users, JP-A-2010-54550 describes a technique for temporarily hiding an OSD (on-screen display) image that is superimposed on an original image, and thus preventing a fall in visibility of the original image. Moreover, JP-A-2009-251306 describes a technique for freezing an image displayed on a main display device with respect to the control of a multi-monitor that displays the same image on a main display device and a sub display device.

When an image display device is shared by plural users, an image containing information that the user does not want other users to see may be displayed. For example, in the technique described in JP-A-2011-215530, the operation screen operated by the user is also displayed on the projection screen.

SUMMARY

An advantage of some aspects of the invention is to provide a technique that prevents an image containing information that the user does not want other users to see from being displayed on the image display device.

An aspect of the invention provides an information processing device including: a display unit which displays a screen; an image output unit which outputs the screen displayed on the display unit to an image display device; a display control unit which displays a first screen including a user interface screen at least in a part of the screen; a detection unit which detects that the user interface screen is switched from a first state that does not include predetermined information to a second state that includes the information; and an output control unit which outputs a second screen that does not include the user interface screen, instead of the first screen displayed by the display control unit, to the image output unit, if it is detected that the user interface screen is switched from the first state to the second state. According to this information processing device, an image including information that the user does not want other users to see is prevented from being displayed by the image display device.

The second state may be a state where the user interface screen has a larger area than in the first state. According to this information processing device, the user interface screen with a large display area is prevented from being displayed by the image display device.

The first state may be a state where an input by a user is not accepted, and the second state may be a state where an input by a user is accepted. According to this information processing device, the user interface image in the state where the user's input is accepted is prevented from being displayed by the image display device.

The first state may be a state where the user interface screen is not displayed on the display unit, and the second state may be a state where the user interface screen is displayed on the display unit. According to this information processing device, the user interface screen is prevented from being displayed by the image display device.

The first state may be a non-active state, and the second state may be an active state. According to this information processing device, an image of a program module in an active state is prevented from being displayed by the image display device.

The second screen may be a still image of the user interface screen before switching from the first state to the second state. According to this information processing device, when an image containing information that the user does not want other users to see is displayed on the display unit, an image that does not contain the information that the user does not want other users to see is displayed by the image display device.

The second screen may be a screen with the same luminance over the entire screen. According to this information processing device, when an image containing information that the user does not want other users to see is displayed on the display unit, an image that does not contain the information that the user does not want other users to see is displayed by the image display device.

The first program module may include a sharing unit which executes processing to allow plural users to share the image display device, and a single application program may include the first program module and the second program module. According to this information processing device, when plural users share the image display device, an image containing information that the user does not want other users to see is prevented from being displayed by the image display device.

BRIEF DESCRIPTION OF THE DRAWINGS

The invention will be described with reference to the accompanying drawings, wherein like numbers reference like elements.

FIG. 10A shows comparison of images.

FIG. 10B shows comparison of images.

DESCRIPTION OF EXEMPLARY EMBODIMENTS

1. Configuration

Figure 1:
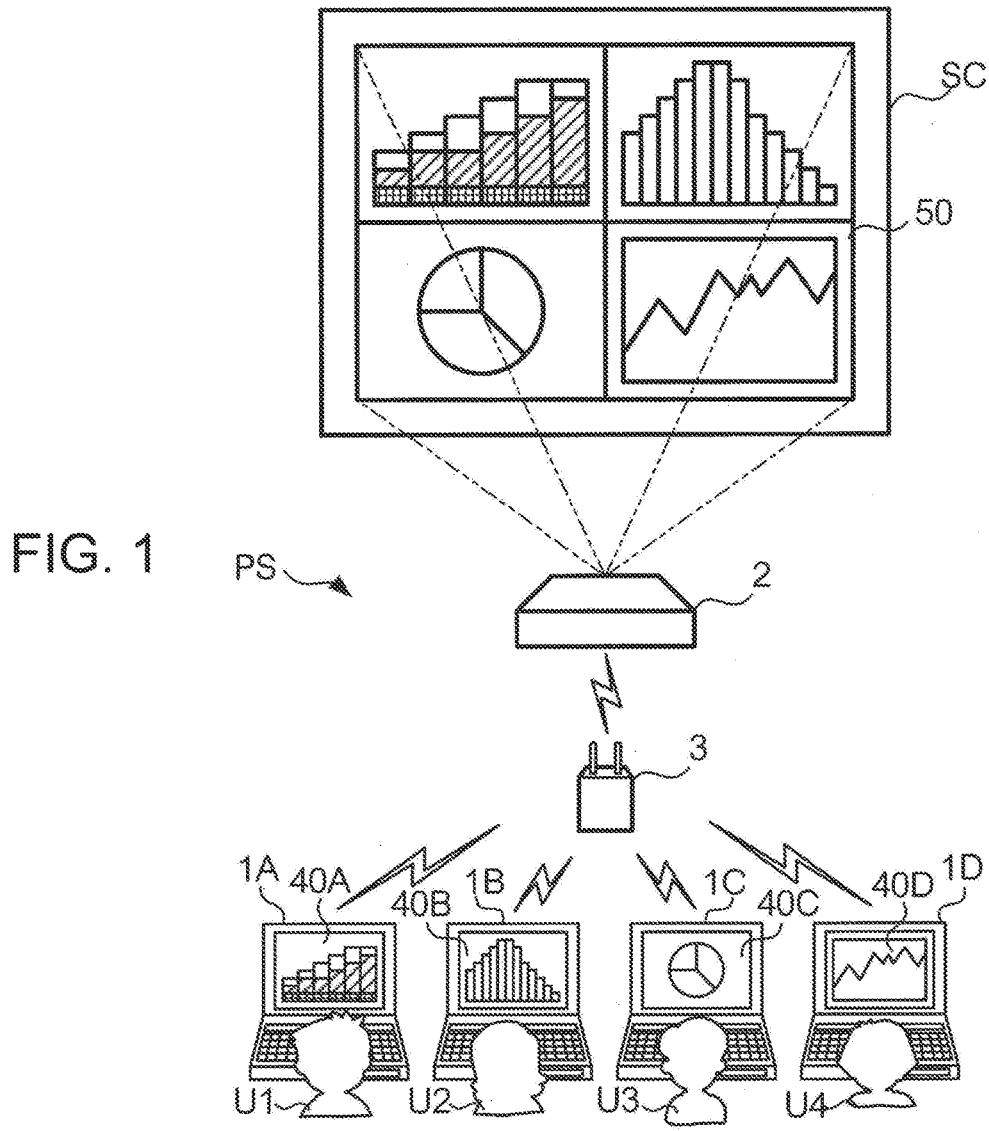
FIG. 1 is a schematic view of a projection system PS.

FIG. 1 is a schematic view of a projection system PS according to an embodiment of the invention. The projection system PS is a system in which a single image display device is shared by plural users. The projection system. PS includes plural personal computers 1 (1A to 1D) and a projector 2.

The personal computer 1 (hereinafter referred to as a "PC 1") is an information processing device that functions as a video source outputting a video signal to the projector 2. In this example, the PC 1A to PC 1D are used by users U1 to U4, respectively. The plural PCs 1 are wirelessly connected to the projector 2 via an access point 3.

The projector 2 is an image display device which projects an image represented by a video signal, on a screen SC. The projector 2 projects an image corresponding to a video signal outputted from at least one of the plural PCs 1, on the screen SC. If video signals are outputted from plural PCs 1, the projector 2 projects, on the screen SC, a single image (hereinafter referred to as a "combined image") formed by a combination of images (hereinafter referred to as "individual images") corresponding to video signal outputted from the respective PCs 1. In the example of FIG. 1, the projector 2 projects, on the screen SC, a combined image 50 formed by a combination of respective individual images 40 (40A to 40D) from the PCs 1A, 1B, 1C and 1D.

In the projection system PS, the layout of the combined image 50 is changed by an instruction from a user U (U1 to U4) inputted via a graphical user interface (hereinafter referred to as a "GUI for change") displayed on a display unit by an application program executed on each PC 1. That is, in the projection system PS, the user U of each PC 1 has the right to change the layout of the combined image 50. In this example, there is no hierarchical relationship such as a master-slave relationship but an equal relationship between the respective users.

Figure 2:
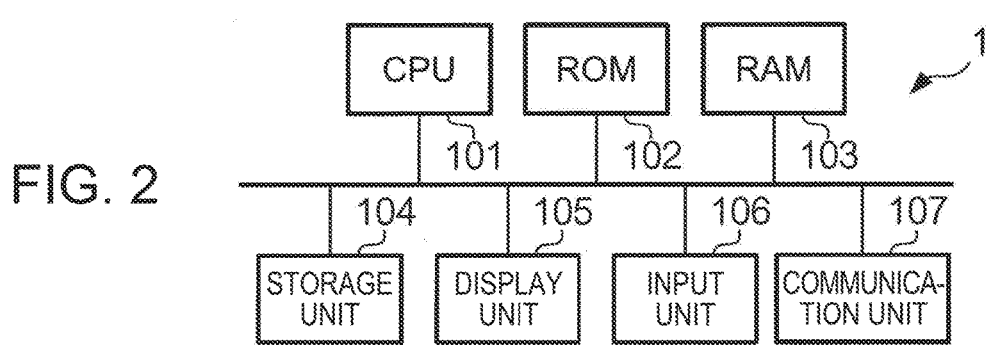
FIG. 2 is a block diagram showing the hardware configuration of a PC.

FIG. 2 is a block diagram showing the hardware configuration of the PC 1. The PC 1 is a computer having a CPU (central processing unit) 101, a ROM (read only memory) 102, a RAM (random access memory) 103, a storage unit 104, a display unit 105, an input unit 106, and a communication unit 107. The CPU 101 is a device (execution unit) which executes a program and thus controls each part of the PC 1. The ROM 102 is a non-volatile storage device in which various programs and data are stored. The RAM 103 is a volatile storage device which stores data. The storage unit 104 is a storage device which stores data and programs, for example, HDD (hard disk drive). The display unit 105 has a display device such as a liquid crystal display or organic EL (electroluminescence) display. The input unit 106 is a device which accepts an operation input from the user U and includes a keyboard, a mouse and various buttons or the like. The communication unit 107 communicates with external devices such as another PC 1 or the projector 2.

Figure 3:
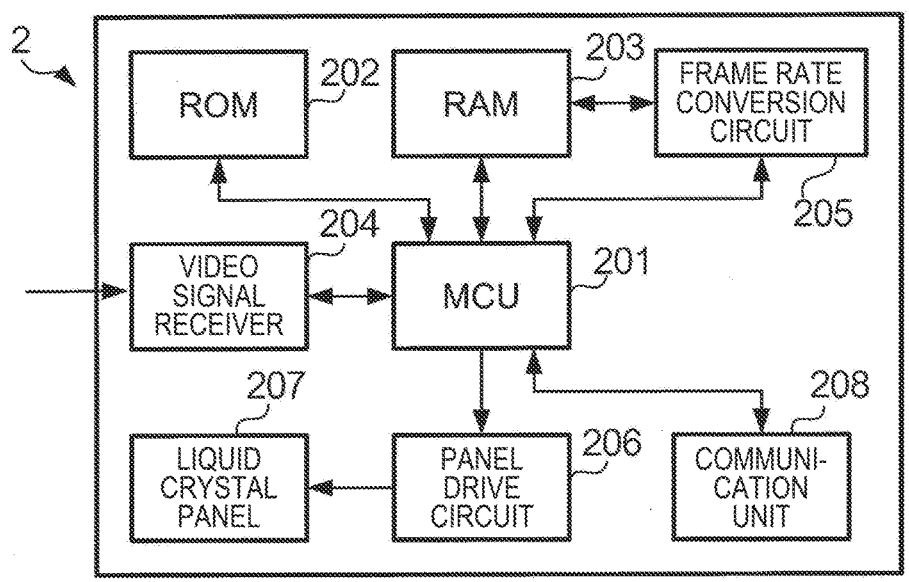
FIG. 3 is a block diagram showing the hardware configuration of a projector.

FIG. 3 is a block diagram showing the hardware configuration of the projector 2. The projector 2 has an MCU (micro control unit) 201, a ROM 202, a RAM 203, a video signal receiver 204, a frame rate conversion circuit 205, a panel drive circuit 206, a liquid crystal panel 207, and a communication unit 208. The MCU 201 is a device which executes a program and thus controls each part of the projector 2. The ROM 202 is a non-volatile storage device in which various programs and data are stored. The RAM 203 is a volatile storage device which stores data. The RAM 203 has a frame memory which stores data representing an image of one frame.

The video signal receiver 204 acquires a video signal from the PC 1. The MCU 201 stores the video signal acquired by the video signal receiver 204 into the frame memory of the RAM 203 as an image of each frame. If the video signal receiver 204 acquires video signals from plural PCs 1, the MCU 201 generates a combined image 50 and stores the combined image into the frame memory. The frame rate conversion circuit 205 converts the frame rate of the video signal so that the number of times image displays are switched during a second matches the frame rate of the panel drive circuit 206. The MCU 201 enlarges or reduces the image stored in the frame memory, according to the resolution of the liquid crystal panel 207. The MCU 201 writes the enlarged or reduced image into the frame memory. The panel drive circuit 206 generates a panel drive signal for driving the liquid crystal panel 207, based on the image read out from the frame memory. The panel drive circuit 206 outputs the panel drive signal to the liquid crystal panel 207. The liquid crystal panel 207 has plural pixels arranged in a matrix. The liquid crystal panel 207 is used as a light modulator (light valve) which modulates an optical characteristic (for example, transmittance) of light radiated from a light source, not shown, for each pixel on the basis of the panel drive signal. The light modulated by the liquid crystal panel 207 is magnified by a lens, not shown, and projected on the screen SC. The communication unit 208 wirelessly communicates with the PC 1 via the access point 3.

Figure 4:
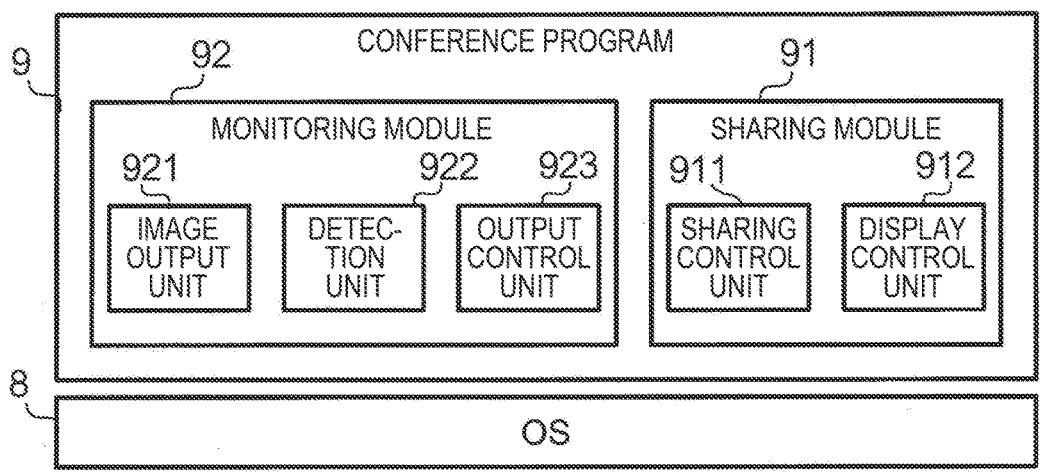
FIG. 4 is a block diagram showing the functional configuration of the PC.

FIG. 4 is a block diagram showing the functional configuration of the PC 1. In this example, the functions according to the invention are realized by software. Therefore, FIG. 4 shows the software configuration of the PC 1. In the PC 1, an OS (operating system) 8 and a conference program 9 are stored in the storage unit 104. The OS 8 is software which provides an interface equivalent to an abstract form of hardware, to an application program. The conference program 9 is an application program for the plural PCs 1 to share the projector 2, and operates on the OS 8. The conference program has a sharing module 91 and a monitoring module 92.

The sharing module 91 is a program module (example of a first program module) for the plural PCs 1 to share the projector 2. The sharing module 91 includes a sharing control unit 911 and a display control unit 912. The sharing control unit 911 carries out processing to establish connection with the projector 2, processing to add, delete and change a user to share the projector 2, and change of user's layout in the combined image. The display control unit 912 outputs data of a user interface screen of the conference program to the OS 8 in order to display this screen on the display unit 105. The OS 8 displays the user interface screen in an area (example of a first area) allocated to the conference program, of the display area of the display unit 105. The term "user interface screen" used here refers to a screen that is displayed as a program is executed, and includes a screen showing the result of execution and a screen prompting the user to enter an input, for example.

The monitoring module 92 is a program module (example of a second program module) for monitoring the behavior of the sharing module 91. The monitoring module 92 includes an image output unit 921, a detection unit 922, and an output control unit 923. The image output unit 921 outputs an image displayed on the display unit 105 to the projector 2. When connection with the projector 2 is established by the sharing module 91, all the images displayed in the display area of the display unit 105 are outputted to the projector 2. That is, the projection image by the projector 2 includes the screen displayed on the display unit 105 of the PC 1 as it is. For example, if a program for reproducing a slide show for a presentation is executed in the PC 1, the projection image includes this slide show. If plural application programs are started in the PC 1 and plural windows are thus displayed, a screen containing the plural windows is projected.

The detection unit 922 detects that the sharing module is switched from a first state to a second state. The first state refers to a state where predetermined information is not included in the user interface screen. The predetermined information is information that the user does not want other users to see, which will be described in detail later. The second state is a state where the predetermined information is included. The output control unit 923 switches the image outputted from the image output unit 921 to a second screen that does not include the user interface screen of the conference program 9, if it is detected that the sharing module 91 is switched from the first state to the second state. The screen that does not include the user interface screen of the conference program 9 refers to a different screen from the screen displayed on the display unit 105 at the time. Normally, the projector 2 projects the same screen (example of a first screen) as the screen displayed on the display unit 105, in the display area allocated to the PC 1. However, the second screen is different from this.

2. Operation 2-1. Outline of Conference Program

Figure 5:
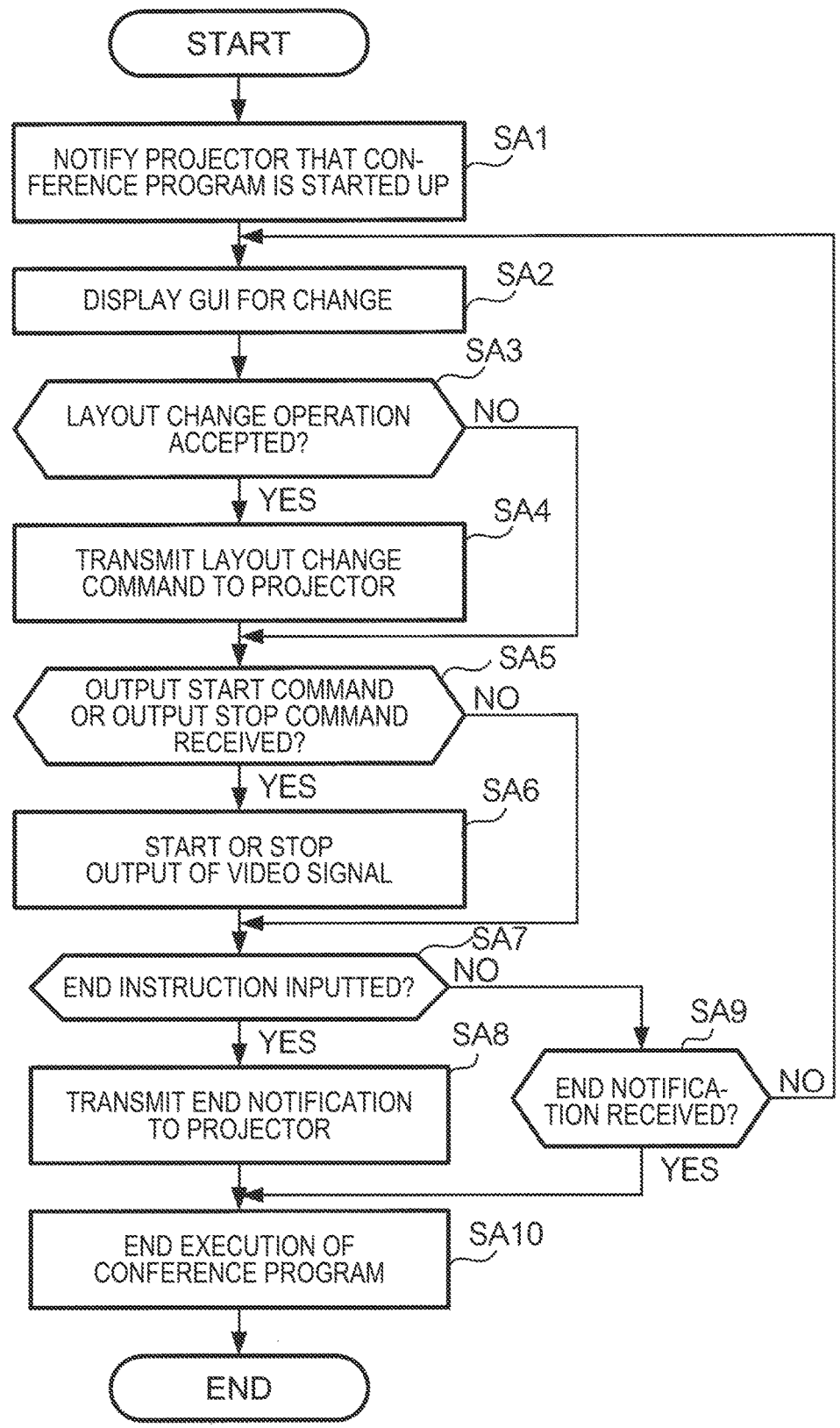
FIG. 5 is a flowchart showing processing by the PC.

FIG. 5 is a flowchart showing processing related to the start or stop of output of a video signal from the PC 1 to the projector 2. FIG. 5 shows processing in which the PC 1 starts or stops outputting a video signal in response to a command from the projector 2. In the following example, the projection system PS is used for a conference attended by plural users. A video signal outputted from each PC 1 to the projector 2 is a signal representing a dynamic image with a predetermined frame rate. The dynamic image data shows a difference from the previous frame. The following processing is started, for example, triggered by the startup of the conference program in the PC 1 in the state where the PC 1 and the projector 2 are wirelessly connected together. In the description below, software such as the conference program 9 may be described as the agent of processing, and this means that the CPU 101 executing this software executes the processing in cooperation with other hardware elements.

In Step SA1, the sharing control unit 911 notifies the projector 2 that the conference program 9 is started up. In this example, the projector 2 manages the PC 1 in which the conference program 9 is started up, and for this management, the projector 2 is notified of the startup of the conference program. This notification includes the user name (user ID). The user name is specified, for example, by login processing. The device ID of the PC 1 may be used instead of the user name. The device ID is an identifier that univocally identifies each of the PCs 1A to 1D.

In Step SA2, the display control unit 912 causes the display unit 105 to display a GUI for change. Specifically, the display control unit 912 generates an image representing the GUI for change and causes the display unit 105 to display this image. An area for the GUI for change (for example, a so-called window) is allocated by the OS 8 to a part of the display area of the display unit 105. The GUI for change is displayed in this area.

Figure 6:
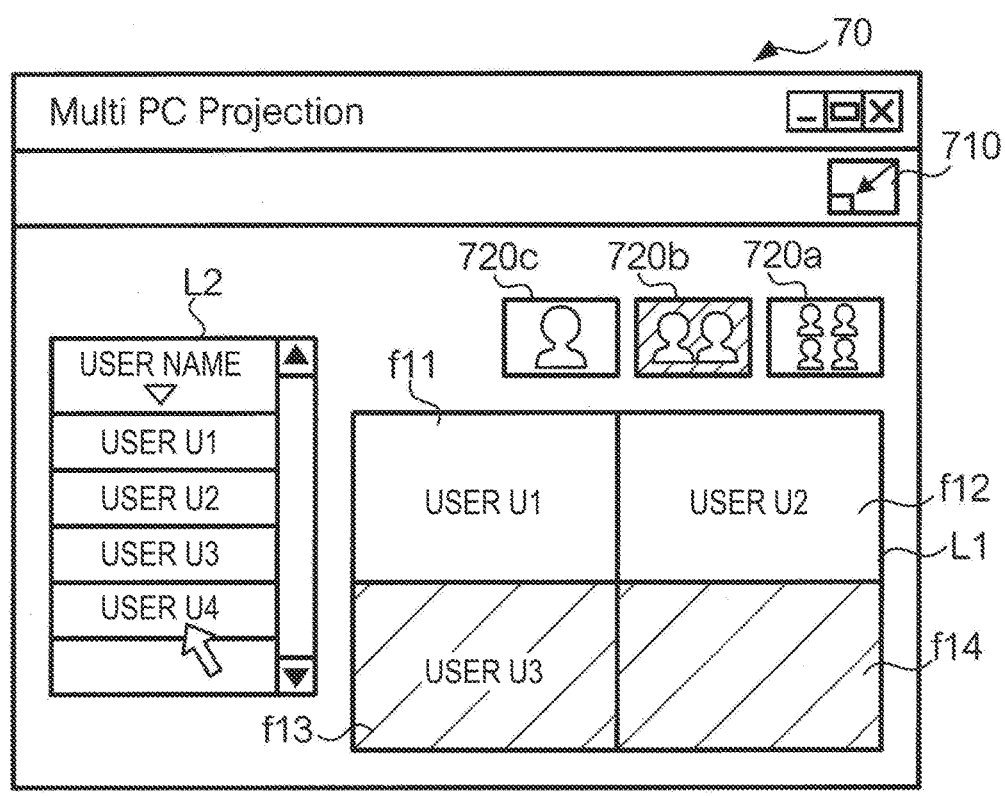
FIG. 6 illustrates a GUI for change in a second state.

FIG. 6 illustrates a GUI for change. A GUI for change 70 has buttons 720 (720a to 720c), an area L1, and an area L2. The buttons 720 are buttons to change the number of divisions of the screen SC (that is, the number of individual images 40 projected on the screen SC). If the button 720a is clicked on, the screen SC is divided into four. If the button 720b is clicked on, the screen SC is divided into two. If the button 720c is clicked on, the screen SC is not divided (a single individual image 40 is displayed). In FIG. 6, the button 720 with hatched background indicates the number of divisions that is currently selected. In this example, the button 720b is selected and the number of divisions is 2.

The area L1 is an area showing the arrangement of the individual images 40 in the combined image 50. The area L1 is divided into areas corresponding to a maximum value of the number of divisions. In this example, the area L1 has two rows by two columns, that is, four individual areas f1 (f11 to f14). In the individual areas f11 to f14, the identifiers of the PCs 1 corresponding to the respective areas (in this example, the user names of the PCs 1) are displayed. In the area L1, the individual area f1 corresponding to a PC 1 where the individual image 40 outputted from the own device is included in the combined image 50 (hereinafter referred to as an "active PC") and the individual area f1 corresponding to a PC 1 that is not an active PC (hereinafter referred to as a "non-active PC") are distinguished to be displayed. In the example shown in FIG. 6, the individual area f1 corresponding to the active PC 1 is displayed with white background, and the individual area f1 corresponding to the non-active PC 1 is displayed with hatched background. That is, the PC 1A and the PC 1B used by the user U1 and the user U2 are active PCs (the individual images 40 of the PC 1A and the PC 1B are actually projected on the screen SC). Meanwhile, the PC 1C used by the user U3 is a non-active PC (the individual image 40 of the PC 1C is not projected on the screen SC yet). In the area L1, not all the individual areas f1 should correspond to the PCs 1. In the example of FIG. 6, no PC 1 corresponds to the individual area f14 (no user name is displayed).

The area L2 is an area for changing the correspondence between the individual area f1 and the PC 1. A list of the identifiers of the PCs 1 that are wirelessly connected to the projector 2 (hereinafter referred to as a "connected PC list") is displayed in the area L2. In the example of FIG. 6, the identifiers of the user U1, the user U2, the user U3 and the user U4 are displayed in the area L2. The correspondence between the individual area f1 and the PC 1 is changed by the user U operating the mouse to drag the identifier displayed in the area L2 (moving the mouse while keeping pressing the mouse button) and then drop the identifier in the area L1 (release the mouse button). For example, if the identifier of the user U4 displayed in the area L2 is dragged and dropped in the individual area f14, the sharing control unit 911 determines that an instruction to cause the PC 1D to correspond to the individual area f14 is inputted, and therefore causes the PC 1D to correspond to the individual area f14. As a result of this correspondence, the identifier of the user U4 is displayed in the individual area f14.

To generate the image of the GUI for change, information such as the number of divisions that is currently selected and the user name of the PC 1 connected to the projector 2 is necessary. Hereinafter, the information used to generate the GUI for change is called layout information. The layout information is provided from the projector 2. The projector 2 stores the layout information and transmits the layout information at predetermined timing to the PC 1 connected to the projector 2. The layout information includes, for example, the number of divisions that is currently selected, the identifier of the active PC, the identifier of the non-active PC, the arrangement of the individual images 40 in the combined image 50, and the user name of the user connected.

Referring again to FIG. 5, in Step SA3, the sharing control unit 911 determines whether a layout change operation is accepted or not. The layout change operation is carried out by the user carrying out an operation input via the GUI for change in the second state, as described above. If it is determined that a layout change operation is accepted (SA3: YES), the sharing control unit 911 stores information indicating the content of the layout change operation into the RAM 103 and shifts the processing to Step SA4. If it is determined that a layout change operation is not accepted (SA3: NO), the sharing control unit 911 shifts the processing to Step SA5.

In Step SA4, the sharing control unit 911 transmits a command to change the layout of the combined image 50 (hereinafter referred to as a "layout change command") to the projector 2. Specifically, the sharing control unit 911 transmits information indicating the content of the layout change operation stored in the RAM 103. As described later, the projector 2 changes the layout information according to this information and distributes the changed layout information to each PC 1.

In Step SA5, the sharing control unit 911 determines whether a command to start outputting a video signal (hereinafter referred to as an "output start command") or a command to stop outputting a video signal (hereinafter referred to as an "output stop command") is received from the projector 2 or not. If it is determined that an output start command or an output stop command is received (SA5: YES), the sharing control unit 911 stores the acquired output start command or output stop command into the RAM 103 and shifts the processing to Step SA6. If it is determined that an output start command or an output stop command is not received (SA5: NO), the sharing control unit 911 shifts the processing to Step SA7.

In Step SA6, the image output unit 921 starts or stops outputting a video signal, in response to the output start command or the output stop command. If the output start command is acquired, the image output unit 921 starts outputting a video signal to the projector 2. If the output stop command is acquired, the image output unit 921 stops outputting a video signal to the projector 2.

In Step SA7, the sharing control unit 911 determines whether an instruction to end the conference (hereinafter referred to as an "end instruction") is inputted or not. The end instruction is inputted, for example, by clicking on an end button displayed on a GUI that is different from the GUI for change, in the conference program. If it is determined that an end instruction is inputted (SA7: YES), the sharing control unit 911 shifts the processing to Step SA8. If it is determined that an end instruction is not inputted (SA7: NO), the sharing control unit 911 shifts the processing to Step SA9.

In Step SA8, the sharing control unit 911 transmits a notification indicating the end instruction (hereinafter referred to as an "end notification") to the projector 2. In Step SA9, the sharing control unit 911 determines whether an end notification is received from the projector 2 or not. In this example, if an end instruction is inputted from a certain PC 1, control is performed to end the conference program in all the PCs 1. If an end instruction is inputted from a certain PC 1, the projector 2 distributes an end notification to the other PCs 1 and causes the conference program to end. If it is determined that an end notification is received (SA9: YES), the sharing control unit 911 shifts the processing to Step SA10. If it is determined that an end notification is not received (SA9: NO), the sharing control unit 911 shifts the processing to Step SA2.

In Step SA10, the sharing control unit 911 ends the execution of the conference program. As the execution of the conference program ends, the display of the GUI for change and the output of the video signal are stopped.

2-2. Processing by Projector 2

Figure 7:
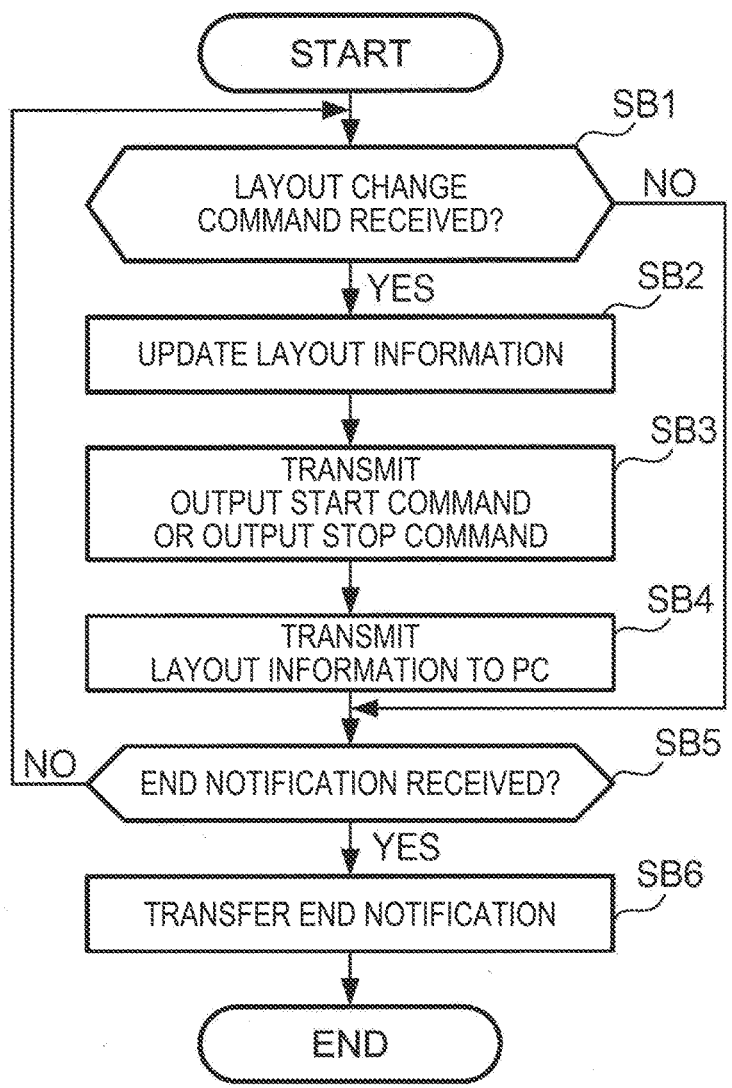
FIG. 7 is a flowchart showing processing by the projector.

FIG. 7 is a flowchart showing the processing by the projector 2. The following processing is started, triggered by the reception by the projector 2 of a notification that the conference program is started up (hereinafter referred to as a "startup notification") from one of the PCs 1. The projector 2 stores the identifier of the PC 1 from which the startup notification is transmitted, into the RAM 203. Also, apart from the processing shown in FIG. 7, the projector 2 carries out processing to generate a combined image and project the generated combined image on the screen SC.

In Step SB1, the MCU 201 determines whether a layout change command is received from one of the PCs 1 or not. If it is determined that a layout change command is received (SB1: YES), the MCU 201 stores the layout change command into the RAM 203 and shifts the processing to Step SB2. If it is determined that a layout change command is not received (SB1: NO), the MCU 201 shifts the processing to Step SB5.

In Step SB2, the MCU 201 changes the layout information stored in the RAM 203 according to the content of the layout change operation carried out in the PC 1. In Step SB3, the MCU 201 transmits an output start command or an output stop command to one or plural PCs 1. Specifically, based on the layout information, the MCU 201 transmits an output start command to a PC 1 that newly becomes an active PC, and transmits an output stop command to a PC 1 that newly becomes a non-active PC.

In Step SB4, the MCU 201 transmits the layout information to each of the PCs 1 where the conference program is started up. In Step SB5, the MCU 201 determines whether an end notification is received from one of the PCs 1 or not. If it is determined that an end notification is received (SB5: YES), the MCU 201 deletes the identifier of the PC from which the end notification is acquired, from the connected PC list, and shifts the processing to Step SB6. If it is determined that an end notification is not received (SB5: NO), the MCU 201 shifts the processing to Step SB1. In Step SB6, the MCU 201 transfers the end notification. Specifically, the MCU 201 transmits the end notification to the PCs 1 included in the connected PC list.

2-3. Processing of Monitoring Module

In the example of FIG. 6, the window displaying the GUI for change 70 includes a window bar and a window main body. The OS 8 provides the function of closing the window main body and displaying only the window bar. The state where the window main body is closed and the state where the window main body is opened can be switched, for example, by the user U operating the mouse to click on a changeover button 710 (FIG. 6).

Figure 8:
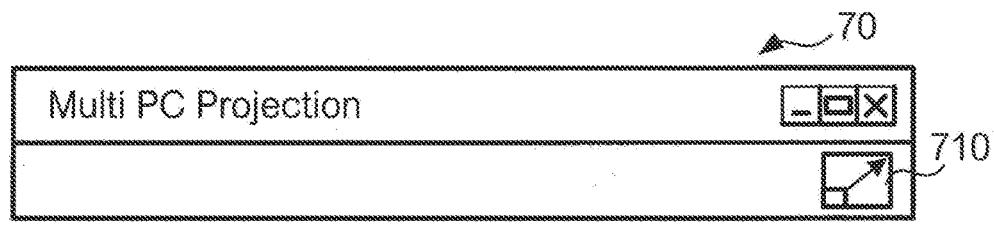
FIG. 8 illustrates a GUI for change in a first state.

FIG. 8 illustrates the state where the window main body is closed in the GUI for change 70 of FIG. 6. The state where the window main body is closed is an example of the first state. The state where the window main body is opened (FIG. 6) is an example of the seconds state. That is, in this example, the output control unit 923 of the monitoring module 92 outputs an image that does not include the real-time GUI for change 70 to the projector 2, triggered by the switching of the GUI for change 70 from the first state to the second state.

Figure 9:
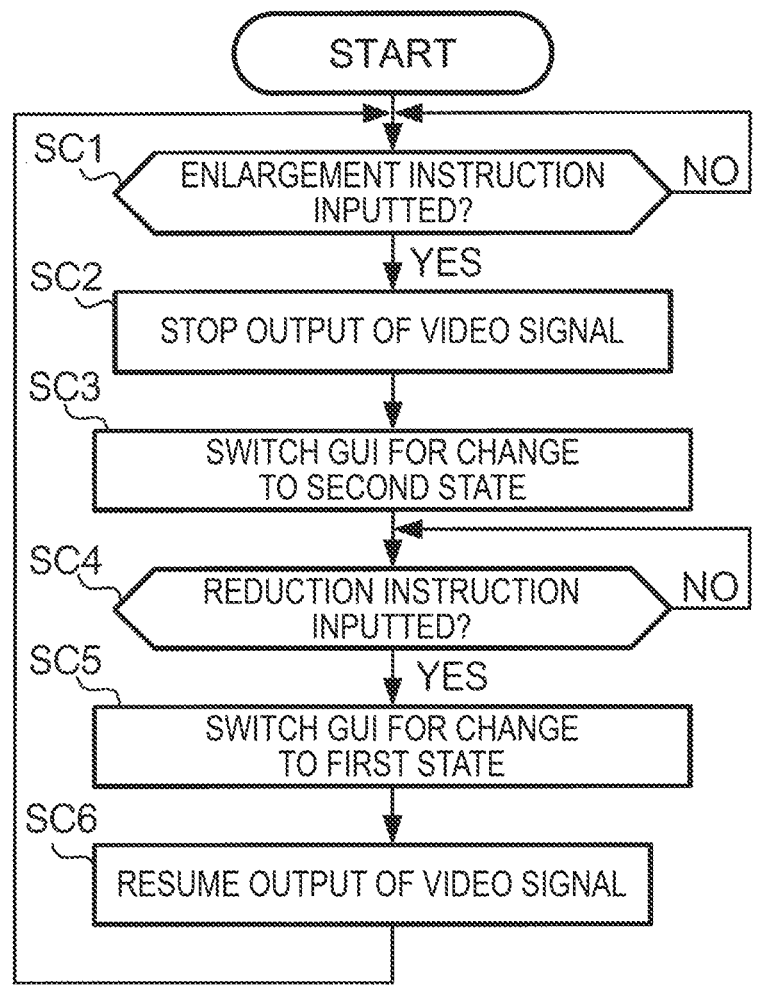
FIG. 9 is a flowchart showing anther processing by the PC.

FIG. 9 is a flowchart showing the processing in the case where the state of the GUI for change is switched. FIG. 9 shows the processing in which the PC 1 starts or stops outputting a video signal according to the operation of the changeover button 710 on the GUI for change 70. The following processing is started, triggered by the circumstance where the output of a video signal is started in Step SA6 of FIG. 5 (that is, the own device is an active PC) and where the GUI for change 70 in the first state is displayed on the display unit 105. Also, the following processing is repeated until the output of a video signal that is started is stopped in Step SA6 again.

In Step SC1, the detection unit 922 determines whether an instruction to switch the GUI for change from the first state to the second state (hereinafter referred to as an "enlargement instruction") is inputted or not (that is, whether the changeover button 710 of FIG. 8 is clicked on or not). If it is determined that an enlargement instruction is inputted (SC1: YES), the detection unit 922 shifts the processing to Step SC2. If it is determined that an enlargement instruction is not inputted (SC1: NO), the detection unit 922 keeps the processing standing by until an enlargement instruction is inputted.

In Step SC2, the output control unit 923 stops the output of a video signal. As the output of a video signal from an active PC is stopped in Step SC2, data showing the difference from the previous frame is not supplied to the projector 2. Therefore, the individual image 40 about this active PC is not updated and is projected on the screen SC in a stopped (frozen) state.

In Step SC3, the display control unit 912 switches the GUI for change 70 from the first state (FIG. 8) to the second state (FIG. 6).

In Step SC4, the detection unit 922 determines whether an instruction to switch the GUI for change from the second state to the first state (hereinafter referred to as a "reduction instruction") is inputted or not (that is, whether the changeover button 710 of FIG. 6 is clicked on or not). If it is determined that a reduction instruction is inputted (SC4: YES), the detection unit 922 shifts the processing to Step SC5. If it is determined that a reduction instruction is not inputted (SC4: NO), the detection unit 922 keeps the processing standing by until a reduction instruction is inputted.

In Step SC5, the display control unit 912 switches the GUI for change 70 from the second state to the first state.

In Step SC6, the output control unit 923 resumes the output of a video signal. Thus, the image projected by the projector 2 includes the same image as the image displayed on the display unit 105.

Figures 10A, 10B:
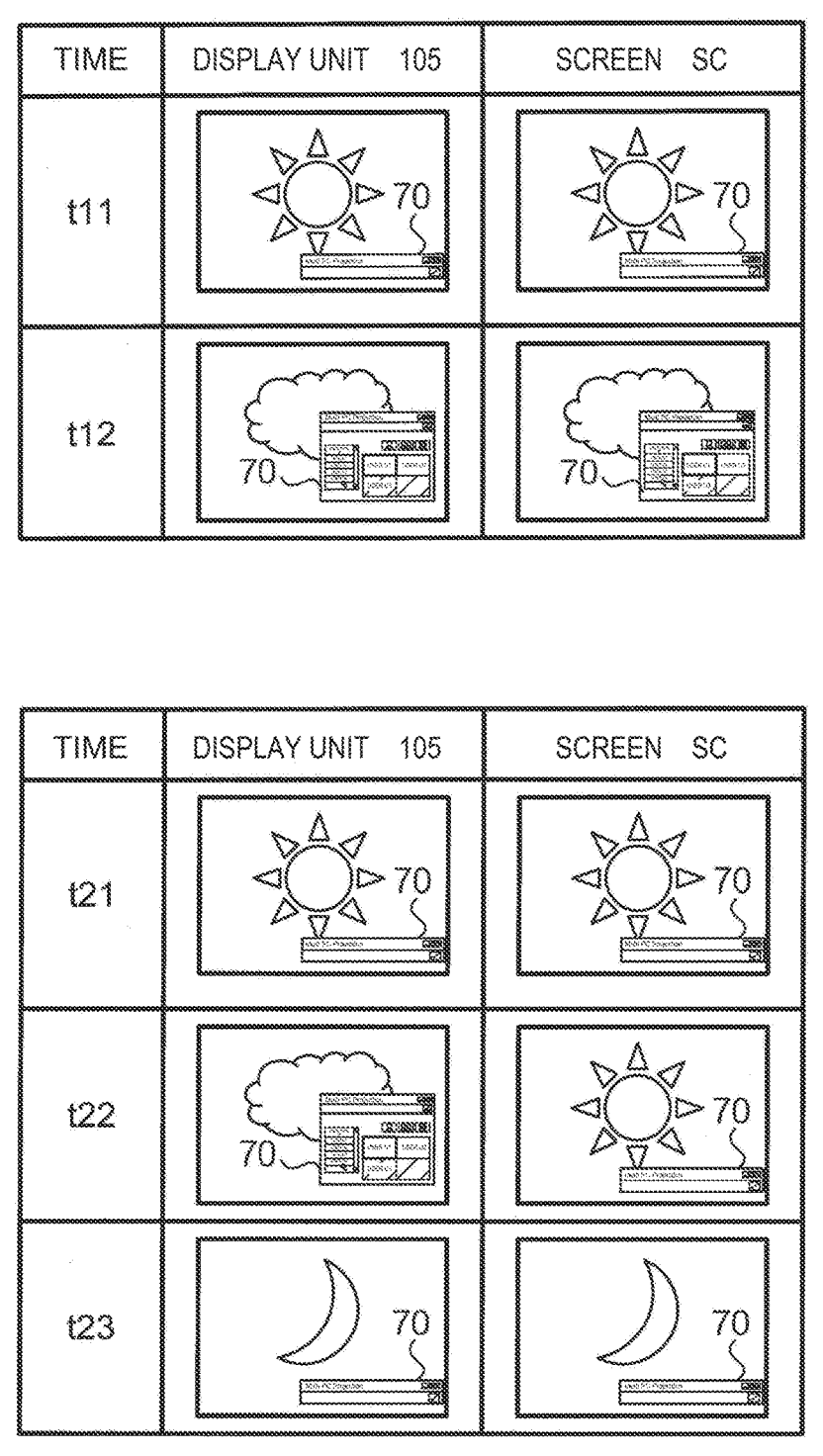

FIGS. 10A and 10B show comparisons between images displayed on the display unit 105 and images projected on the screen SC (images displayed on the liquid crystal panel 207). FIGS. 10A and 10B show comparisons in an example where a single individual image 40 is projected alone (example where the number of divisions is 1) and where the PC 1 having the illustrated display unit 105 is an active PC. FIG. 10A shows change with time of the individual image 40 in the case where the processing shown in FIG. 9 is not carried out. In FIG. 10A, a time t12 represents a time that is later than a time t11 and after an enlargement instruction is inputted. At the time t11, the GUI for change 70 in the first state is superimposed on the main image on the display unit 105 and the screen SC. At the time t12, the GUI for change 70 in the second state is superimposed on the main image on the display unit 105 and the screen SC. As shown in FIG. 10A, if the processing shown in FIG. 9 is not carried out, the GUI for change 70 in the second state is projected on the screen SC. The GUI 70 is a screen for changing the setting and therefore includes information that the user does not want other users to see.

FIG. 10B shows change with time of the individual image 40 in the case where the processing shown in FIG. 9 is carried out. In FIG. 10B, a time t22 is a time that is later than a time t21 and after an enlargement instruction is inputted. A time t23 is a time that is later than the time t22 and after a reduction instruction is inputted. At the time t21, the GUI for change 70 in the first state is superimposed on the main image on the display unit 105 and the screen SC. At the time t22, the GUI for change 70 in the second state is superimposed on the main image on the display unit 105. Also, at the time t22, the individual image 40 that is projected on the screen SC immediately before the enlargement instruction is inputted (here, at the time t21) is projected on the screen SC. At the time t23, the GUI for change 70 in the first state is superimposed on the main image on the display unit 105 and the screen SC. As shown in FIG. 10B, if the processing shown in FIG. 9 is carried out, when an enlargement instruction is inputted, a different image from the image displayed on the display unit 105 (still image of the image displayed on the display unit 105) is projected on the screen SC. Therefore, the GUI for change 70 in the second state is projected on the screen SC and the process of a layout change operation is prevented from being projected on the screen SC.

Figure 11:
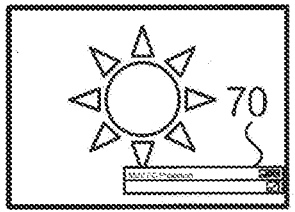
FIG. 11 shows another comparison of images.

FIG. 11 shows another comparison between images displayed on the display unit 105 and images projected on the screen SC. FIG. 11 shows a comparison in the case where another PC 1 that is different from the PC 1 having the illustrated display unit 105 is an active PC. In FIG. 11, a time t32 is a time that is later than a time t31 and after an enlargement instruction is inputted. As shown in FIG. 11, if another PC 1 that is different from the PC 1 having the illustrated display unit 105 is an active PC, the image on the illustrated display unit 105 is not projected on the screen SC at any time. Therefore, the process of a layout change operation is not projected on the screen SC in this case, either.

3. Modifications

The invention is not limited to the above embodiment and various modified embodiments are possible. Hereinafter, several modifications will be described. Two or more of the following modifications may be combined.

3-1. Modification 1

The program module to be monitored by the monitoring module is not limited to the sharing module 91 described in the embodiment, that is, the program module for processing to share the projector. A program module that provides other functions than sharing of the projector, such as word processor, mailer, presentation software, or media player, may be a target to be monitored.

The target to be monitored may be the whole of the program module or may be a specific function (sub program module) of the program module. For example, if the program module to be monitored is a media player, the function of changing the setting of content reproduction may be a target to be monitored, without monitoring the function of reproducing contents. That is, in this case, when a content is being reproduced, the same image as the image displayed on the display unit 105 is projected by the projector 2. When the user is changing the setting, a different image from the image displayed on the display unit 105 is projected by the projector 2.

As another example, if the program module to be monitored is a mailer having the function of providing a notification in the form of a pop-up window showing the sender and title of a received email when the email is received, the communication function of this received email may be a target to be monitored. In this case, when the mailer operating in the background is issuing a receiving notification on receiving an email, a different image from the image displayed on the display unit 105 is projected by the projector 2.

In this way, the function to be monitored, that is, information that the user does not want other users to see, varies depending on the program module to be monitored.

3-2. Modification 2

The monitoring module and the program module to be monitored may be included in separate application programs. For example, the monitoring module may be provided as an application program (monitoring application) that is separate from a conference program including the program module to be monitored. In this case, the application program to be monitored may be preset in the monitoring application or may be registered by the user.

3-3. Modification 3

The first state and the second state of the program module to be monitored are not limited to the states described in the embodiment. The first state and the second state may correspond to, for example, at least one of the following 1. to 4.

1. The first state has a small display area, whereas the second state has a large display area.

The states described in the embodiment are of this example. That is, the state where the window main body is closed is the first state, and the state where the window main body is opened is the second state. Alternatively, an icon state may be the first state, whereas the state where the window is opened may be the second state.

2. The user's input is not accepted in the first state, whereas the user's input is accepted in the second state.

For example, the state where the window main body is closed and the iconized state, which are already described, are equivalent to the state where the user's input is not accepted. Also, for example, the state where a content is being reproduced by a media player may be equivalent to the first state, and the state where a dialog box for setting is opened may be equivalent to the second state.

3. A screen is not displayed in the first state, whereas a screen is displayed in the second state.

For example, the state where an application is operating in the background may be equivalent to the first state, whereas the state where the application is operating in the foreground may be equivalent to the second state.

4. The first state is non-active, whereas the second state is active.

For example, in a multi-window system, the application of the window displayed at the forefront is active, and the applications of the other windows are non-active. The terms "active" and "non-active" here have different meanings from the terms "active PC" and "non-active PC" used in the description of the area L1.

3-4. Modification 4

The second screen is not limited to the screen described in the embodiment. In the example of the embodiment, the second screen is a still image of the image that is displayed on the display unit 105 immediately before the program module to be monitored is switched from the first state to the second state. In this example, the screen looks frozen to other users. In another example, the second screen may be a screen with uniform luminance over the entire face, for example, a totally black screen. In this example, the screen looks muted to other users. In still another example, the second screen may be a screen in which an image displayed on the display unit 105 is pixelated or hatched. In this example, other users can see that the projected image is changing, though they cannot see the information in detail. In the first two examples, since the projected image is a still image, there is a possibility of misunderstanding that trouble has occurred in the PC 1 that is the video source. However, with a pixelated image, the possibility of such misunderstanding can be reduced.

The method for displaying the second screen is not limited to the method described in the embodiment. In the embodiment, the output of a video signal from the PC 1 to the projector 2 is stopped, thus generating the second image. However, the second screen may be generated in the PC 1 and a video signal representing the second screen may be outputted to the projector 2.

3-5. Other Modifications

The user interface screen is not limited to the example of FIG. 6. Moreover, the layout change operation is not limited to the operation described in the embodiment. For example, in the area L1, the user U may drag an identifier shown in one individual area f1 and drop the identifier in another individual area f1, thus changing the correspondence between the individual area f1 and the PC 1.

In the projection system PS, the PC 1 provided with the right to change the layout is not limited to all the PCs 1 connected to the projector 2. It is also possible that only one or some of the PCs 1 are provided with the right to change the layout. In this case, in the PC 1 that is not provided with the right to change the layout, the GUI for change is not displayed and the processing shown in FIG. 9 is not carried out, either.

The hardware configurations of the PC 1 and the projector 2 are not limited to the configurations shown in FIGS. 2 and 3. The PC 1 and the projector 2 may have any hardware configurations that can realize the functions of FIG. 4. For example, a volatile storage device may be used instead of the ROM 102 or the ROM 202. As another example, the light modulator of the projector 2 may be a light modulator having a combination of a liquid crystal panel and a color wheel, a light modulator using a digital mirror device (DMD), or a light modulator having a combination of a DMD and a color wheel. Also, the projector 2 may include the function of the access point 3.

The configuration of the projection system PS is not limited to the configuration shown in FIG. 1. For example, only one PC 1 may be connected to the projector 2, and the other PCs 1 may be connected to the one PC 1. In this case, the PC 1 connected to the projector 2 generates a combined image according to video signals outputted from the other PCs 1 and outputs a video signal representing the generated combined image to the projector 2. Also, this PC 1 transmits layout information to the other PCs 1. Moreover, the video signal outputted from the PC 1 may be an analog signal. If the video signal is an analog signal, when an instruction to switch the GUI for change to the second state is inputted, for example, a video signal representing a predetermined image is outputted to the projector 2.

The information processing device to which the invention is applied is not limited to a personal computer. For example, the invention may also be applied to a tablet terminal. Also, the image display device to which the information processing device according to the invention outputs a signal is not limited to the projector 2. The image display device may be any device that displays an image corresponding to a signal outputted form the information processing device, for example, a liquid crystal display device having a direct-view liquid crystal display.

The connection between the PC 1 and the projector 2 is not limited to wireless connection. The PC 1 and the projector 2 may be wire-connected via an image signal cable and a USB (universal serial bus) cable or the like.

What is claimed is:

1. An information processing device comprising:
   a display unit; and
   at least one processor configured to:
      cause the display unit to display a first screen including a user interface screen; and
      if the user interface screen is switched from a first state to a second state, then:
         output a second screen to an image display device instead of the first screen displayed by the display unit, or
         stop outputting the first screen to the image display device,
      wherein the user interface screen does not include predetermined information in the first state and includes the predetermined information in the second state, and the second screen includes the user interface screen that does not include the predetermined information, and
      wherein the predetermined information comprises a list of a plurality of identifiers of a plurality of information processing devices communicatively connected to the image display device.

2. The information processing device according to claim 1, wherein the second state is a state where the user interface screen has a larger area than in the first state.

3. The information processing device according to claim 1, wherein the first state is a state where an input by a user is not accepted, and the second state is a state where an input by a user is accepted.

4. The information processing device according to claim 1, wherein the first state is a non-active state, and the second state is an active state.

5. The information processing device according to claim 1, wherein the second screen is a still image of the user interface screen before the user interface screen is switched from the first state to the second state.

6. The information processing device according to claim 1, wherein the second screen is a screen with the same luminance over the entire screen.

7. The information processing device according to claim 1, wherein the at least one processor is further configured to execute processing to allow a plurality of users to share the image display device.

8. The information processing device according to claim 1, wherein if the at least one processor detects that the user interface screen is switched from the second state to the first state, the at least one processor outputs the first screen to the image display device.

9. A method for controlling an information processing device communicatively connected to an image display device, the method comprising:
   displaying a first screen including a user interface screen; and
   if the user interface screen is switched from a first state to a second state, then:
      outputting a second screen to the image display device instead of the first screen, or
      stopping output of the first screen to the image display device,
   wherein the user interface screen does not include predetermined information in the first state and includes the predetermined information in the second state, and the second screen includes the user interface screen that does not include the predetermined information, and
   wherein the predetermined information comprises a list of a plurality of identifiers of a plurality of information processing devices communicatively connected to the image display device.

10. A computer-readable non-transitory recording medium storing a program that causes a computer to:
   display a first screen including a user interface screen by a display unit; and
   if the user interface screen is switched from a first state to a second state, then:
      output a second screen to an image display device instead of the first screen, or
      stop output of the first screen to the image display device,
   wherein the user interface screen does not include predetermined information in the first state and includes the predetermined information in the second state, and the second screen includes the user interface screen that does not include the predetermined information, and
   wherein the predetermined information comprises a list of a plurality of identifiers of a plurality of information processing devices communicatively connected to the image display device.

* * * * *